Figure 6:
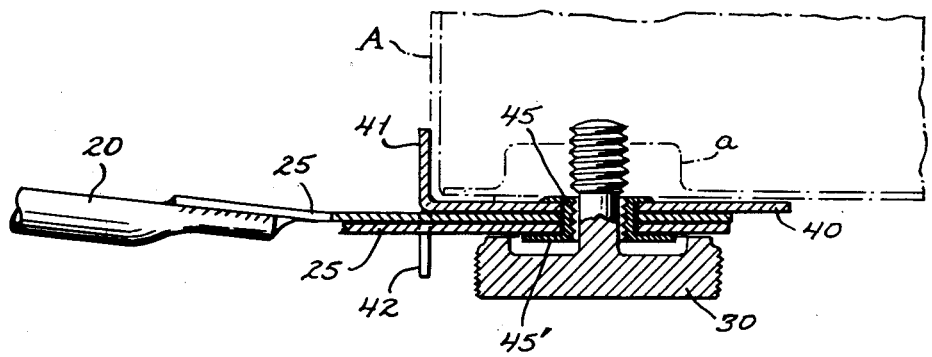

April 5, 1949. W. S. HENCKE ET AL 2,466,171
FIELD DEFINING ATTACHMENT FOR CAMERAS
Filed June 24, 1946 2 Sheets-Sheet 1
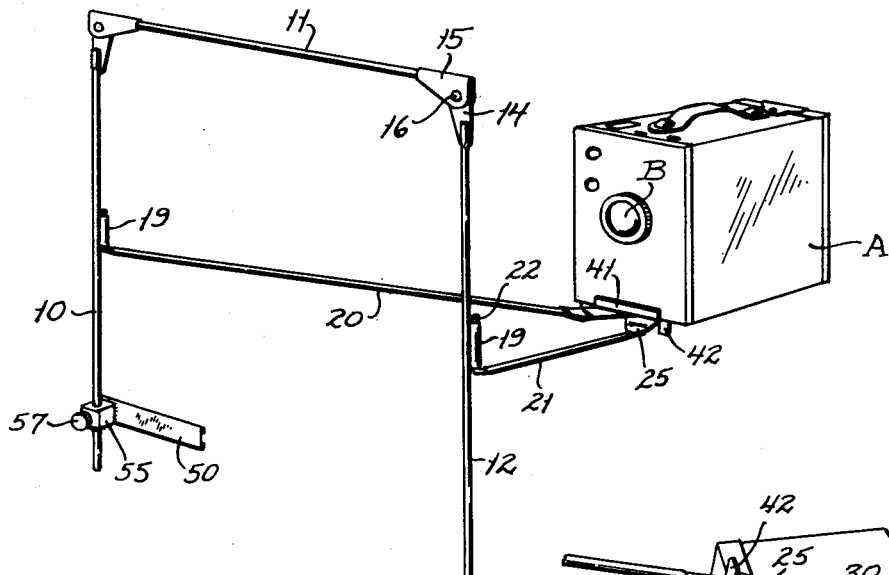
FIG.1
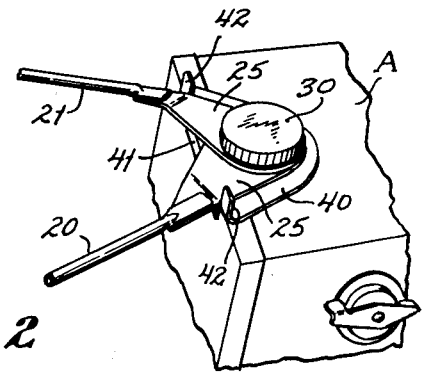
FIG.2
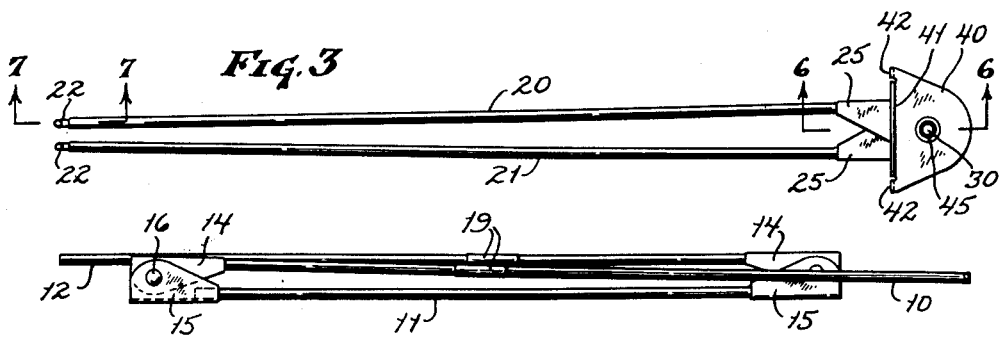
FIG.3
FIG.4
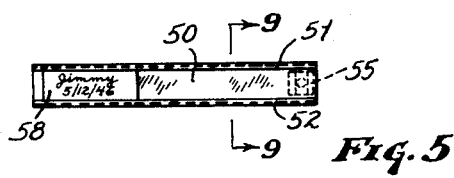
FIG.5
INVENTORS
WILLIAM S. HENCKE and
CHARLES H. SAND
BY
Bates, Teare, & McBean
ATTORNEYS April 5, 1949.   W. S. HENCKE ET AL   2,466,171
FIELD DEFINING ATTACHMENT FOR CAMERAS
Filed June 24, 1946    2 Sheets-Sheet 2

INVENTORS
WILLIAM S. HENCKE and
CHARLES H. SAND
BY
Bates, Teare, & McBean
ATTORNEYS Patented Apr. 5, 1949

2,466,171

UNITED STATES PATENT OFFICE 2,466,171

FIELD DEFINING ATTACHMENT FOR CAMERAS

William S. Hencke and Charles H. Sand, Willoughby, Ohio

Application June 24, 1946, Serial No. 679,018

7 Claims. (Cl. 88—24)

This invention relates to an attachment for a hand camera enabling the accurate positioning of the object the proper distance from the lens. By applying a special portrait lens to a hand camera it is possible to take portraits provided the object is at a very definite distance from the lens, usually about 13". In taking portraits with such an equipped camera it has heretofore been very difficult in maintaining the proper distance between the subject and the lens. This is particularly true in taking portraits of young children.

The general object of our invention is to provide a suitable frame adapted for attachment to the camera and serving to locate the subject at the proper distance from the portrait lens on the camera. Our frame when in position on the camera bears such relation to the lens that it is outside of the visual angle of the lens, so as not to appear in the photograph but to serve at once as a finder for locating the subject in the center of the film and also locate the camera at the proper distance from the subject.

Another object is to provide such a frame in foldable form adapted to be readily carried from place to place, and collapsible into small space for easy packing.

Still another object is to provide the frame with means for carrying a name or date adapted to be reproduced on the margin of the film to identify the resulting photographs.

Our invention is hereinafter more fully described in connection with a preferred embodiment illustrated in the drawings and the essential novel features are summarized in the claims.

Figure 7:
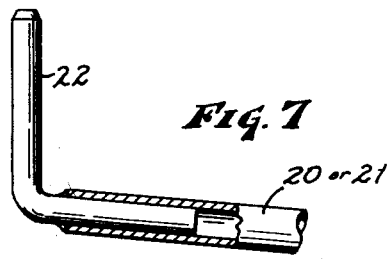
Figure 8:
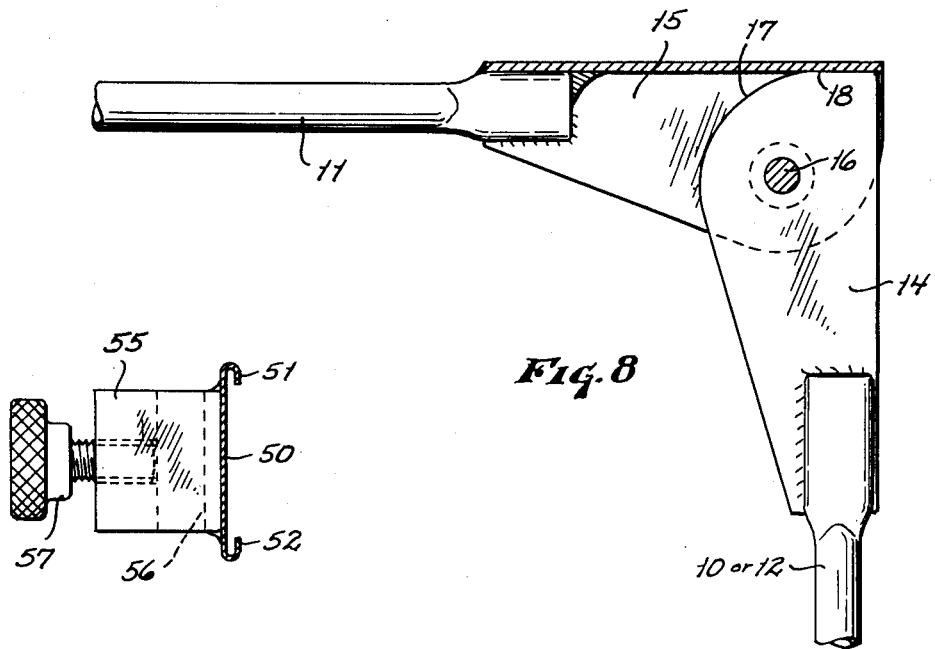
Figure 9:
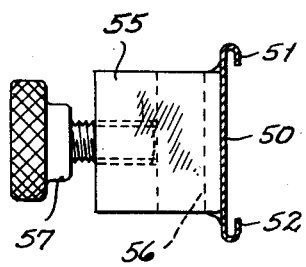

In the drawings, Fig. 1 is a perspective of our locating frame attached to a hand camera; Fig. 2 is a fragmentary bottom view of portions of the camera and the frame, showing the attachment of the frame to the camera; Fig. 3 is a view of a portion of the device comprising the anchorage by which it is to be secured to the camera and the frame-supporting arms in folded position; Fig. 4 is a view of the framing portion of the device folded for transportation; Fig. 5 is a detail of the device for carrying a name or date to be photographed; Fig. 6 is an enlarged vertical section of the attaching portion of the device, being an enlarged section on the line 6—6 on Fig. 3; Fig. 7 is an elevation partly broken away and partly in section of the end portion of one of the supporting arms, as indicated by the line 4—4 on Fig. 3; Fig. 8 is an enlarged view of two members of the frame at a corner thereof; Fig. 9 is a cross section of the device for carrying the name and date indication, it being an enlarged cross section on the line 9—9 on Fig. 5.

In Figs. 1, 2 and 6, A indicates any suitable camera, carrying a portrait lens B, which may be a separate lens mounted over the regular lens of the camera. Such cameras are usually provided with a threaded opening in the base for attachment of a screw to clamp the camera to a tripod, such threaded opening being indicated in Fig. 6 in a boss $a$ within the base portion of the camera.

Our locating device, as shown in the drawings, comprises three bars 10, 11, 12 hinged together in series and adapted to be positioned on three sides of a rectangle, and two supporting arms 20 and 21 secured respectively to the arms 10 and 12 and converging toward their opposite ends where they may be both secured by a threaded bolt 30 to the camera. Each of the frame arms 10 and 12 is provided at its upper end with a flattened extension 14 and the cross bar 11 is provided at each end with a doubled sheet metal extension 15 adapted to receive within itself the extension 14. These extensions are hinged together by pin 16. The extensions 14 readily may be sheet metal plates welded to the bar 10 or 12 while the extension 15 is a double sheet metal member welded to the bar 11. The upper portion of the extension 14 is curved concentrically about the pivot 16 for a distance, as shown at 17, and then merges into a flattened edge 18 at right angles to the bar 10 or 12. The result is that the two bars 10 and 12 may be folded parallel with the bar 11 for storage purposes, as shown in Fig. 4, but when extended the flattened portion 18 of each vertical bar abutting the bent portion of the extension 15 of the cross bar 11 holds the vertical bars at right angles to the bar 11, as shown in Figs. 1 and 8.

Each of the bars 10 and 12 is provided in an intermediate region with a hollow sleeve 19 which may be secured thereto by welding. The supporting bars 20 and 21 have upturned ends 22 adapted to occupy these sleeves. As shown in Fig. 7 these supporting bars are tubular and there are short rods bent at right angles entering the tubular portion and welded thereto to provide the upright extensions 22. When these extensions occupy the sleeves the two supporting bars are firmly attached to the open frame provided by the rods 10, 11 and 12, of which it is convenient to call the rods 10 and 12 the "extreme rods" and the rod 11 the "intermediate rod."

Each of the supporting rods 20 and 21 is provided at its rear end with a flattened portion 26 which may be a metal plate welded to the rod. These two flattened portions overlap each other and they are provided with registering holes, through which the bolt 30 may be passed to attach the arms to the camera.

To cause the arms 20 and 21 to diverge equally from the axis of the camera, and thus space the rectangular frame equally, we provide an intermediate plate 40 which coacts with both the camera and the arms. This plate is a flat member, having an opening to register with the openings of the arms, and has a front flange 41 extending upwardly to engage the front edge of the camera and two downwardly extending ears 42 to engage outer edges of the extensions 26 of the two arms 20 and 21.

To prevent misplacement of the parts we prefer to secure the plate 40 permanently to the common ends of the two supporting bars. We effect this by mounting a bushing 45 in the intermediate plate and the extensions to the two arms with flanges extended laterally over the plate and beneath the lowermost arm, as shown in Fig. 6. This permanently secures the three parts together but allows independent movement. It is very convenient to make the bushing with an enlarged head 45' beneath the arms and to peen the upper end outwardly above the top plate after the parts are put together.

The clamping bolt 30 passing through the bushing 45 has a knurled head on its lower end by which it may be readily grasped and turned, the threaded shank screwing into the nut carried by the camera. In maintaining the two arms, the locating plate and the bolt permanently together, as a unit, while allowing free rotation of the bolt, we have found it very convenient to provide the bore of the bushing with a thread tapped slightly under size to make an unduly snug engagement with the screw thread of the bolt and to strip the lower portion of the threads about the shank of the bolt as illustrated in Fig. 6. This allows the bolt to be passed by sufficient force through the bushing until the threads have cleared the bushing. Then the bolt is perfectly free to be rotated by its head into the nut on the camera, while the tightness of the bushing thread prevents inadvertent separation.

When the device is mounted on the camera with the bolt 30 screwed tight into place and the flange 41 abutting the front edge of the camera, the two arms when swung apart their maximum distance allowed by the lugs 42 are just in position to enter the two sleeves 19 on the open rectangular frame. We thus have outside of the visual angle of the camera a frame at just the desired focal distance from the camera lens, and this frame is rigidly supported by the camera by means also outside of the angle of the camera lens.

Accordingly in taking pictures it is only necessary to locate the subject in the general region of the frame, about equally spaced from the vertical and horizontal bars thereof, and press the button of the camera to take a perfect portrait picture. Our frame not only insures proper distance from the lens, but acts also as a finder, reducing the time required in properly positioning the camera.

It is frequently desirable to form a permanent indication on a negative of the name of the subject or the date of the exposure or both. Our device provides for this by mounting on one of the upright bars 10 or 12 an inwardly extending carrier which may carry suitable indicia within the range of the lens and which will accordingly be photographed on the film, this carrier being so located that the indication comes at the margin of the picture.

A carrier for such permanent indication, is illustrated in Figs. 1, 5 and 9. It comprises a horizontal strip 50 with its top and bottom edges 51, 52 flanged over and into position parallel with the body of the strip and spaced slightly therefrom and means for securing the strip to one of the bars 10 or 12. As shown, such means comprises a block 55 welded to the back of the strip having an opening 56 through which the rod 10 or 12 may be passed and carrying a set screw 57 adapted to abut such rod and lock the device in place. A suitable card 58 carrying the indicia to be photographed on the film is slidably mounted in the carrier 50 and may be located in any lateral position thereon, and by properly locating the carrier on its supporting rod, the card may be held in such position that its indication will be photographed on the margin of the negative outside of the range of the portrait itself.

It may be noted that if the threaded opening in the base of the camera comes farther back than that illustrated, the locating plate 40 will be correspondingly extended toward the front and the upward flange will be a greater distance from the bolt opening than that illustrated, and the supporting rods will be correspondingly lengthened. If the camera has no threaded base opening, a separate clamp may be provided, suitable for engaging the side edges of the camera having intermediately a threaded opening to receive the bolt 30.

For storage purposes, the simple unscrewing of the bolt 30 detaches the device from the camera; the removal of the supporting arms from the sleeves on the frame separates those parts, and thus the supporting portion may be folded into the compact condition shown in Fig. 3 and the frame portion into the compact condition shown in Fig. 4, while the indicator carrier may be entirely removed, as indicated in Fig. 5, and hence these three units may be very readily mounted in a tube or other carrier of small extent.

Our device provides a very useful attachment especially for taking portraits of children and enabling the operator to select a time of the exposure, when the attitude of the child or when the expression on the child's face is most pleasing. It is not necessary to hold the child in any particular position; simply whenever the picture is to be taken the frame is to be placed about the subject's face, in a way which does not bother the subject at all, the button of the camera pressed, and the picture taken. The use of our frame not only avoids taking time with the finder on the camera but locates the subject more accurately than can be done with a finder at such short range.

1. In an attachment for cameras, the combination of a frame comprising an intermediate rod and two extreme rods hinged to the opposite ends of the intermediate rod in a manner to enable the extreme rods to fold down into parallelism with the intermediate rod or to extend at right angles thereto, means adjacent the hinges of the rod for limiting the spreading of the extreme rods to a right angle to the intermediate rod, and means adapted to be attached to the camera for supporting the frame at the desired object distance in front of the lens of a camera.

2. In an attachment for a camera, the combination of an open frame having an intermediate bar and two extreme bars hinged respectively to opposite ends of the intermediate bar, each extreme bar being provided with a sleeve extending parallel with it, a pair of supporting rods adapted to be secured to the camera and having upright forward ends adapted to occupy such sleeves.

3. In an attachment for cameras, the combination of an open frame comprising an intermediate rod and two extreme rods hinged to the opposite ends of the intermediate rod in a manner to enable the extreme rods to fold down into parallelism with the intermediate rod or to extend at right angles thereto, a pair of supporting rods, means associated with their rear ends for connecting them together pivotally, enabling them to be folded into parallelism or spread, and means for securing the supporting rods to said extreme rods respectively.

4. A camera attachment comprising an open frame adapted to locate an object, a pair of converging rods supporting the frame, a plate to which said rods are secured, said plate having an upstanding projection adapted to engage the front of the camera and having a pair of downwardly projecting lugs adapted to engage opposite sides of the rods, and means for securing the plate to the camera whereby the downward lugs locate the rods with reference to the plate and the upward projection locates the plate with reference to the camera.

5. A camera attachment comprising an open frame adapted to locate an object visible through the frame, a pair of converging rods supporting the frame, a plate to which the converged ends of said rods are secured, said plate having an upstanding flange adapted to engage the front of the camera when the plate extends beneath the camera to limit the position of the plate with reference to the camera and means for securing the plate to the camera.

6. The combination of a foldable frame comprising a top rod and two side rods hinged thereto, a pair of supporting rods having upwardly extending ends adapted to occupy sockets carried by the side rods of the frame, said supporting rods converging and having flattened ends overlapping each other, a clamping device pivotally attached to the overlapped ends of the rods, means on the clamping device adapted to engage the outer sides of the rods when the forward ends are attached to the hinged frame, and means on the clamping device for engaging a camera.

7. In a camera attachment, the combination of an open frame, comprising an intermediate rod and two extreme rods, the extreme rods being hinged at one end respectively to the opposite ends of the intermediate rod in a manner to enable the three rods to be folded into parallelism or to stand in a single plane as three sides of a rectangle, a pair of supporting rods, provision for attaching one end of each supporting rod to a different one of the extreme rods at an intermediate region thereof, and means for attaching the other ends of the supporting rods to a camera.

WM. S. HENCKE.
CHAS. H. SAND.

REFERENCES CITED

The following references are of record in the file of this patent:

UNITED STATES PATENTS

| Number | Name | Date |
|---|---|---|
| 1,837,704 | Dean | Dec. 22, 1931 |
| 1,913,167 | Little | June 6, 1933 |
| 2,112,449 | Proudfit | Mar. 29, 1938 |
| 2,185,508 | Kunze | Jan. 2, 1940 |